United States Patent
Endo (12) 
(10) Patent No.: US 6,363,491 B1
(45) Date of Patent: Mar. 26, 2002

(54) USB APPARATUS AND USB HUB APPARATUS

(75) Inventor: Mitsunori Endo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/295,867

(22) Filed: Apr. 21, 1999

(30) Foreign Application Priority Data

Apr. 23, 1998 (JP) ............................................. 10-113317

(51) Int. Cl.⁷ ................................................. G06F 1/26
(52) U.S. Cl. ...................................... 713/310; 713/340
(58) Field of Search ................................. 713/300, 310, 713/320, 324, 340; 710/126, 129, 100, 107

(56) References Cited

U.S. PATENT DOCUMENTS

| | | | | |
|---|---|---|---|---|
| 6,000,042 A | * | 12/1999 | Henrie | 713/340 |
| 6,105,143 A | * | 8/2000 | Kim | 713/324 |
| 6,125,455 A | * | 9/2000 | Yeo | 713/300 |
| 6,147,682 A | * | 11/2000 | Kim | 713/310 |

OTHER PUBLICATIONS

Universal Serial Bus Specification, Revision 1.1, Sep. 23, 1998, pp. 18, 134–139,255,261,262,266, and 272.*

* cited by examiner

Primary Examiner—Glenn A. Auve
(74) Attorney, Agent, or Firm—Frommer Lawrence & Haug LLP; William S. Frommer (57) ABSTRACT

A USB apparatus or a USB hub apparatus having a USB port to be used for transmitting and receiving information to and from a host computer according to the USB protocol is provided with a power supplying means for supplying power to each internal section of the USB apparatus or the USB hub apparatus, a power supply voltage detecting means for detecting presence/absence of a power supply voltage to be supplied from the host computer to the USB port, and a supply power control means for controlling the power that is supplied by the power supplying means in accordance with a detection result of the power supply voltage detecting means. The power supply voltage detecting means detects a power supply voltage that is supplied from the host computer to the USB port and informs the supply power control means of the detection result. The supply power control means causes the power supplying means to stop supplying power to each internal section of the USB apparatus or the USB hub apparatus if no power is supplied from the host computer to the USB port (i.e., the power of the host computer is off), and controls the power supplying means to have it supply ordinary power to each internal section of the USB apparatus or the USB hub apparatus if power is supplied from the host computer to the USB apparatus or the USB hub apparatus.

4 Claims, 6 Drawing Sheets

USB APPARATUS AND USB HUB APPARATUS

BACKGROUND OF THE INVENTION

1. Field of the Invention

The present invention relates to a USB apparatus and a USB hub apparatus. In particular, the invention relates to a USB apparatus which is connected to a host computer and transmits and receives information to and from it according to a protocol that complies with the USB standard, as well as to a USB hub apparatus which interconnects a host computer and one or more USB apparatuses and allows transmission and reception of information to be performed between them according to a protocol that complies with the USB standard.

2. Description of the Prior Art

In recent years, the reduction in the power consumption of electronic equipment has been promoted as part of various measures against the earth warming problem.

For example, personal computers or the like are constructed in such a manner that if a state that input devices (e.g., a keyboard, a mouse, etc.) are not manipulated has continued for a predetermined time or more, the personal computer automatically detects its unused state and renders a CRT (cathode-ray tube) monitor, for example, in a sleep mode to thereby reduce the power consumption.

Incidentally, in recent years, the USB (universal serial bus) has come into being as an interface for easily connecting a plurality of peripheral devices to a personal computer and now attracts much attention. Further, peripheral devices having a port for USB (hereinafter referred to as a USB port) have come to be used increasingly.

The employment of the USB enables commonization of interfaces of mice, keyboards, printers, modems, speakers, joy sticks, etc. that are separate from each other conventionally. Further, equipping a personal computer main body with only one USB port enables up to 127 peripheral devices of the above kinds to be connected to each other in star-like form if a USB hub apparatus is used.

Such an apparatus having a USB port (hereinafter abbreviated as a USB apparatus) and a hub apparatus that has a USB port and serves to connect a plurality of USB apparatuses (hereinafter abbreviated as a USB hub apparatus) are also constructed in such a manner that if they have not communicated with the host computer for a predetermined time or more, a sleep mode as mentioned above is established.

However, in such USB apparatuses and USB hub apparatuses, a USB control section, internal circuits, a preheating circuit, etc. are always supplied with power in case the personal computer restarts a transmission. This results in a problem that even if, for example, the power of the personal computer is off, a certain amount of power continues to be consumed.

SUMMARY OF THE INVENTION

The present invention has been made in view of the above circumstances, and an object of the invention is therefore to provide a USB apparatus and a USB hub apparatus which can reduce power that is consumed by the USB apparatus or the USB hub apparatus in a state that the power of a personal computer is off.

To attain the above object, the invention provides a USB apparatus which is connected to a host computer and transmits and receive information to and from it according to a protocol that complies with a USB standard, comprising power supplying means for supplying power to each section of the USB apparatus; power supply voltage detecting means for detecting presence/absence of a power supply voltage to be supplied from the host computer; and supply power control means for controlling the power that is supplied by the power supplying means in accordance with a detection result of the power supply voltage detecting means.

The power supplying means supplies power to each section of the USB apparatus. The power supply voltage detecting means detects presence/absence of a power supply voltage to be supplied from the host computer. The supply power control means controls the power that is supplied by the power supplying means in accordance with a detection result of the power supply voltage detecting means.

For example, the power supplying means supplies power to each section of the USB apparatus. The power supply voltage detecting means detects presence/absence of a power supply voltage to be supplied from the host computer via a "V bus +5 V" terminal of a USB port. Referring to a detection result of the power supply voltage detecting means, the supply power control means allows the supply of power to internal circuits if the power supply voltage is supplied to the "V bus +5 V" terminal, and stops the supply of power to the internal circuits if the power supply voltage is not supplied to the "V bus +5 V" terminal.

Further, to attain the above object, the invention provides a USB hub apparatus which interconnects a host computer to one or more USB apparatuses and allows transmission and reception of information to be performed between the host computer and the USB apparatuses according to a protocol that complies with a USB standard, comprising power supplying means for supplying power to each section of the USB hub apparatus; power supply voltage detecting means for detecting presence/absence of a power supply voltage to be supplied from the host computer; and supply power control means for controlling the power that is supplied by the power supplying means in accordance with a detection result of the power supply voltage detecting means.

The power supplying means supplies power to each section of the USB hub apparatus. The power supply voltage detecting means detects presence/absence of a power supply voltage to be supplied from the host computer. The supply power control means controls the power that is supplied by the power supplying means in accordance with a detection result of the power supply voltage detecting means.

For example, the power supplying means supplies power to each section of the USB hub apparatus. The power supply voltage detecting means detects presence/absence of a power supply voltage to be supplied from the host computer via a "V bus +5 V" terminal of a USB port. Referring to a detection result of the power supply voltage detecting means, the supply power control means allows the supply of power to internal circuits if the power supply voltage is supplied to the "V bus +5 V" terminal, and stops the supply of power to the internal circuits if the power supply voltage is not supplied to the "V bus +5 V" terminal.

DETAILED DESCRIPTION OF THE PREFERRED EMBODIMENT

An embodiment of the present invention will be hereinafter described with reference to the accompanying drawings.

Figure 1:
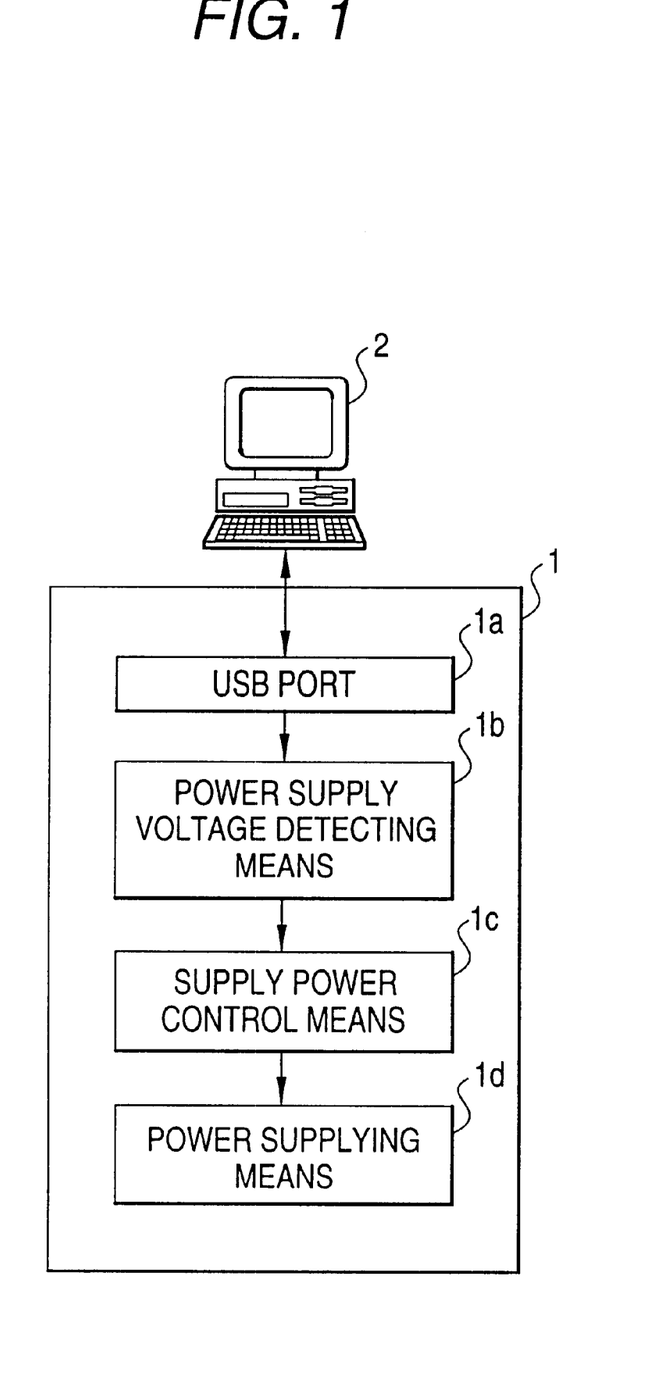
FIG. 1 shows the principle of the present invention.

FIG. 1 shows the principle of the invention. As shown in FIG. 1, a USB apparatus (or a USB hub apparatus) 1 is USB-connected to a personal computer 2 serving as a host computer to enable transmission and reception of data.

The USB apparatus 1 is composed of a USB port 1a, a power supply voltage detecting means 1b, a supply power control means 1c, and a power supplying means 1d. The USB apparatus 1 is a printer, a modem, a scanner, or the like.

The USB port 1a is a serial interface, and transmits and receives data to and from the personal computer 2. The power supply voltage detecting means 1b detects whether a power supply voltage "+5 V" is supplied from a "V bus +5 V" terminal of the USB port 1a. The supply power control means 1c controls, in accordance with a detection result of the power supply voltage detecting means 1b, the power that is supplied by the power supplying means 1d. The power supplying means 1d supplies power to each section of the USB apparatus 1.

Next, the operation of the system of FIG. 1 will be described.

Now, assume that the power switch of the USB apparatus 1 has been turned on in a state that the power switch of the personal computer 2 is off. In response, the power supplying means 1d tries to start supplying power to each section of the apparatus.

Since in this state the power of the personal computer 2 is off, no voltage is applied to the "V bus +5 V" terminal of the USB port 1a. The power supply voltage detecting means 1b detects that no power supply voltage is applied to the "V bus +5 V" terminal and informs the supply power control means 1c of that fact.

The supply power control means 1c controls the power supplying means 1d to establish a state that the supply of power is stopped or low power is supplied. As a result, the USB apparatus 1 is rendered in a state that each section of the apparatus is not supplied with power though the power switch is on.

If the power switch of the personal computer 2 is turned on in this state, a power supply voltage "+5 V" is applied to the "V bus +5 V" terminal of the USB port 1a.

As a result, the power supply voltage detecting means 1b detects that the power supply voltage is applied to the "V bus +5 V" terminal and informs the supply power control means 1c of that fact.

The supply power control means 1c controls the power supplying means 1d to have it start supplying power to each section of the apparatus. As a result, the USB apparatus 1 is rendered operational.

If the power switch of the personal computer 2 is again turned off in this state, a state is established that the power supplying means 1d of the USB apparatus 1 to each section of the apparatus does not supply power or supplies low power to each section, in the same manner as in the above case.

A USB hub apparatus has a configuration and operation similar to the above, and hence descriptions therefor are omitted.

As described above, according to the USB apparatus and the USB hub apparatus of the invention, the supply of power to each section of the apparatus is stopped or low power is supplied to each section in a case where the power of the personal computer 2 is off. This makes it possible to reduce the power consumption.

Next, an example configuration of a system according to the embodiment of the invention will be described with reference to FIG. 2.

Figure 2:
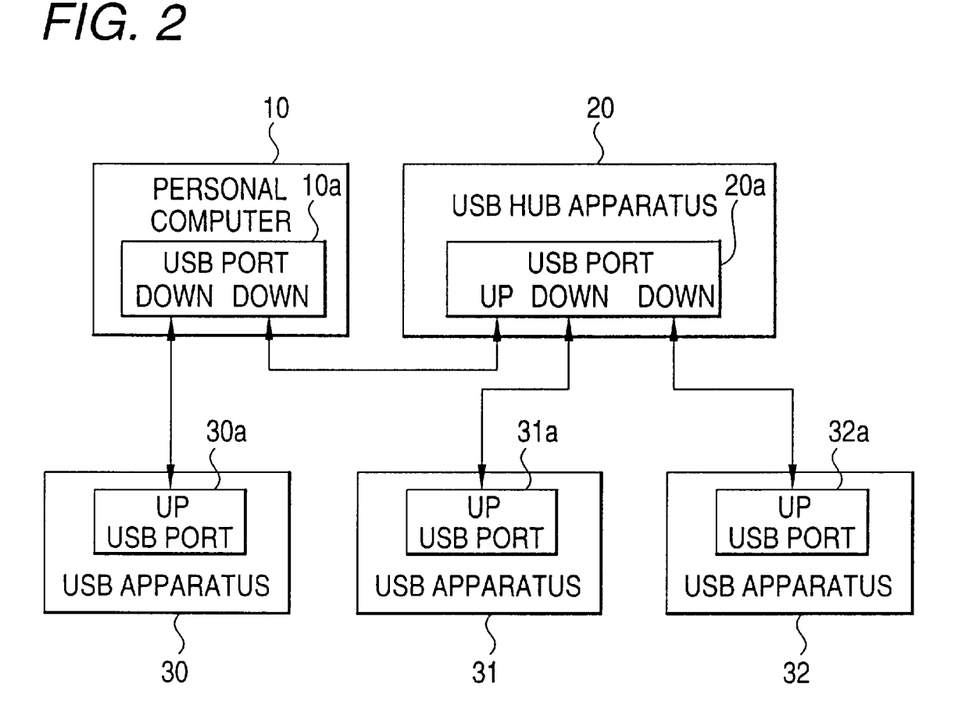
FIG. 2 is a block diagram showing an example configuration of a system according to an embodiment of the invention.

As shown in FIG. 2, a personal computer 10 is equipped with a USB port 10a and hence can transmit and receive data to and from a USB apparatus 30 and a USB hub apparatus 20.

The USB hub apparatus 20 connects the personal computer 10 to USB apparatuses 31 and 32 via a USB port 20a and thereby enables data transmission and reception between them.

The USB apparatuses 30–32 are equipped with respective USB ports 30a–32a, and transmit and receive data to and from the personal computer 10.

Symbol "Up" in each USB port means "up stream" and indicates that a signal is input thereto. Symbol "Down" means "down stream" and indicates that a signal is output therefrom.

Figure 3:
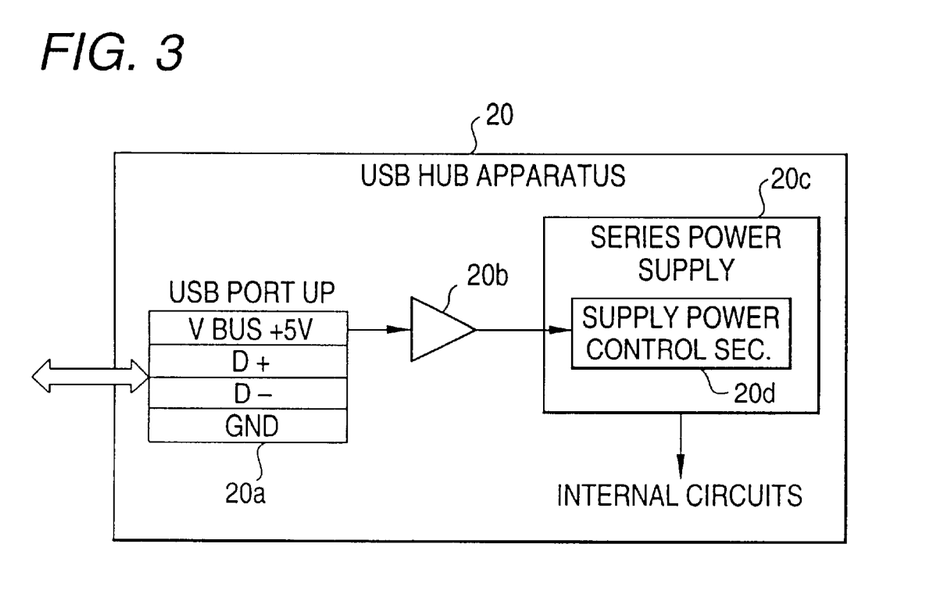
FIG. 3 is a block diagram showing a detailed configuration example of part of a USB hub apparatus shown in FIG. 2.

FIG. 3 shows a detailed configuration example of part of the USB hub apparatus 20 shown in FIG. 2.

As shown in FIG. 3, the USB port 20a is composed of a "V bus +5 V" terminal at which a power supply voltage is supplied from the personal computer 10 to the USB port 20a, "D+" and "D−" terminals for data input/output, and a "GND" terminal that is connected to the chassis.

An amplification circuit 20b amplifies a voltage that is applied to the "V bus +5 V" terminal at a predetermined gain and outputs a resulting voltage. A series power supply 20c, which is a power supply circuit, supplies DC power to the internal circuits of the USB hub apparatus 20. A supply power control section 20d, which is incorporated in the series power supply 20c, controls the power that is supplied from the series power supply 20c to the internal circuits.

Next, a detailed configuration example of the series power supply 20c shown in FIG. 3 will be described with reference to FIG. 4.

Figure 4:
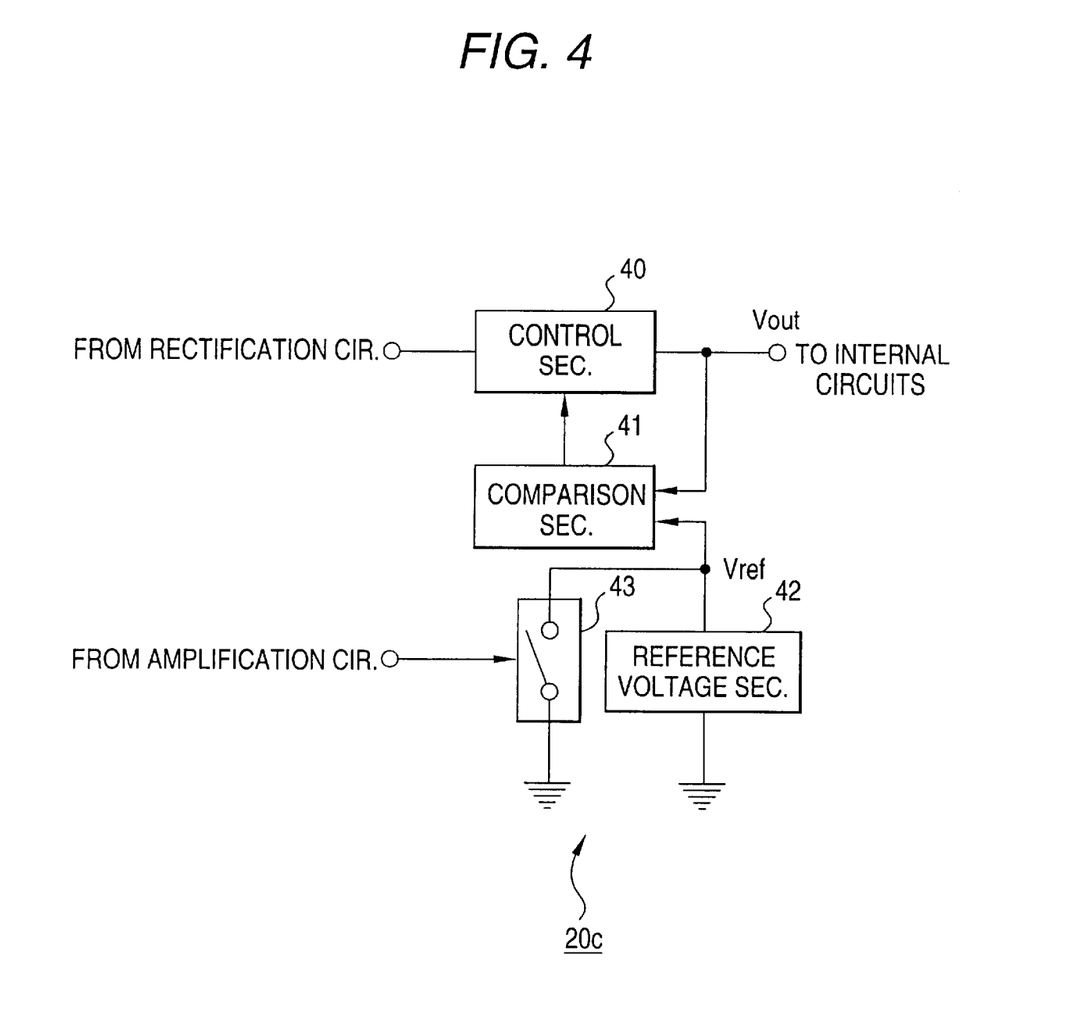
FIG. 4 is a block diagram showing a detailed configuration example of a series power supply shown in FIG. 3.

As shown in FIG. 4, the series power supply 20c is composed of a control section 40, a comparison section 41, a reference voltage section 42, and a control switch 43.

The control section 40 converts a DC voltage that includes a variable component and is supplied from a rectification circuit (not shown; circuit for lowering and rectifying a commercial power supply voltage) to a constant DC voltage and outputs it.

The comparison section 41 compares a voltage Vout that is output from the control section 40 with a reference voltage Vref that is output from the reference voltage section 42, and controls the control section 40 so that the ratio of Vout to Vref is kept constant. That is, Vout is Vref multiplied by a predetermined value.

The reference voltage section 42 is formed by a Zener diode, for example, and generates the reference voltage Vref.

The control switch 43, which corresponds to the supply power control section 20d shown in FIG. 3, is connected to the output terminal of the amplifying circuit 20b. The control switch 43 is rendered in an on-state (conductive state) when the power supply voltage is not applied to the "V bus +5 V" terminal, and is rendered in an off-state (open state) when "+5 V" is applied to the "V bus +5 V" terminal.

As a result, the reference voltage Vref that is the predetermined voltage is output from the reference voltage section 42 when the power supply voltage is applied to the "V bus +5 V" terminal, and the output level of the reference voltage section 42 becomes the ground level (=0 V) when the power supply voltage is not applied to the "V bus +5 V" terminal.

Now, a description will be made of correspondence (just an example) between the principle diagram of FIG. 1 and the embodiment of FIGS. 3 and 4.

The USB port 1a corresponds to the USB port 20a. The power supply voltage detecting means 1b corresponds to the amplification circuit 20b. The supply power control means 1c corresponds to the control switch 43. The power supplying means 1d corresponds to the control section 40.

Next, a detailed configuration example of the USB apparatus 30 shown in FIG. 2 will be described with reference to FIG. 5.

Figure 5:
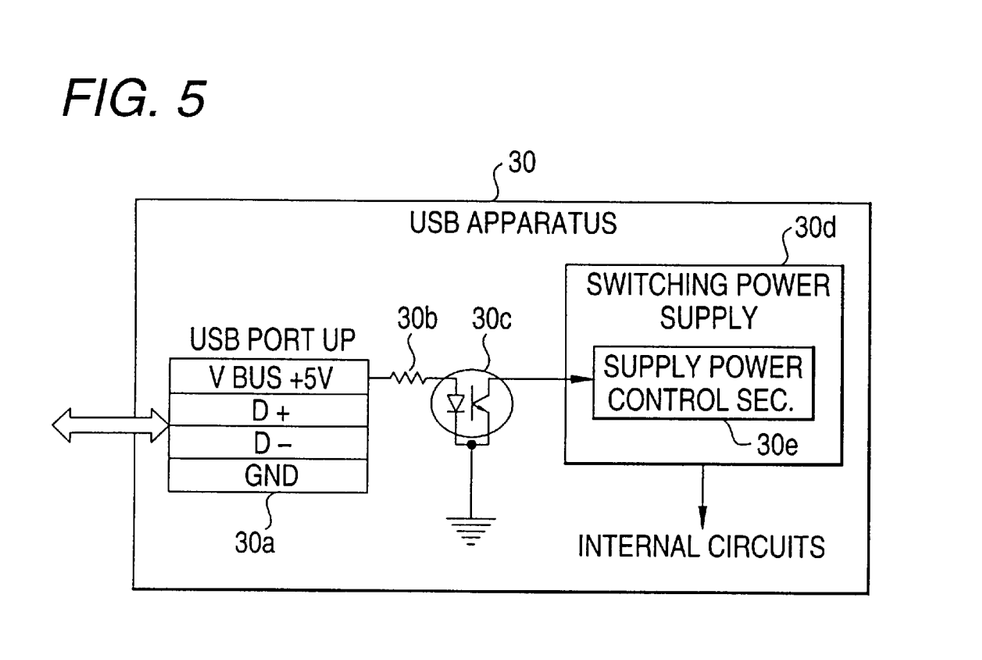
FIG. 5 is a block diagram showing a detailed configuration example of part of a USB apparatus 30 shown in FIG. 2.

As shown in FIG. 5, the USB apparatus 30 is composed of a USB port 30a, a protective resistor 30b, a photocoupler 30c, and a switching power supply 30d. The switching power supply 30d has a supply power control section 30e.

The USB port 30a is composed of a "V bus +5 V" terminal at which a power supply voltage is supplied from the personal computer 10, "D+" and "D−" terminals for data input/output, and a "GND" terminal that is connected to the chassis.

The protective resistor 30b prevents an LED (light-emitting diode) incorporated in the photocoupler 30c from being damaged by an excess current flowing through it.

The photocoupler 30c supplies a voltage corresponding to the voltage at the "V bus +5 V" terminal of the USB port 30a to the supply power control section 30e of the switching power supply 30d while isolating those from each other electrically.

The switching power supply 30d generates a predetermined voltage by lowering, through switching, a voltage of about 100 V that is supplied from a commercial power supply, and supplies the generated voltage to the internal circuits.

The supply power control section 30e, which is incorporated in the switching power supply 30d, controls the power that is supplied from the switching power supply 30d to the internal circuits.

Next, a detailed configuration example of the switching power supply 30d shown in FIG. 5 will be described with reference to FIG. 6.

Figure 6:
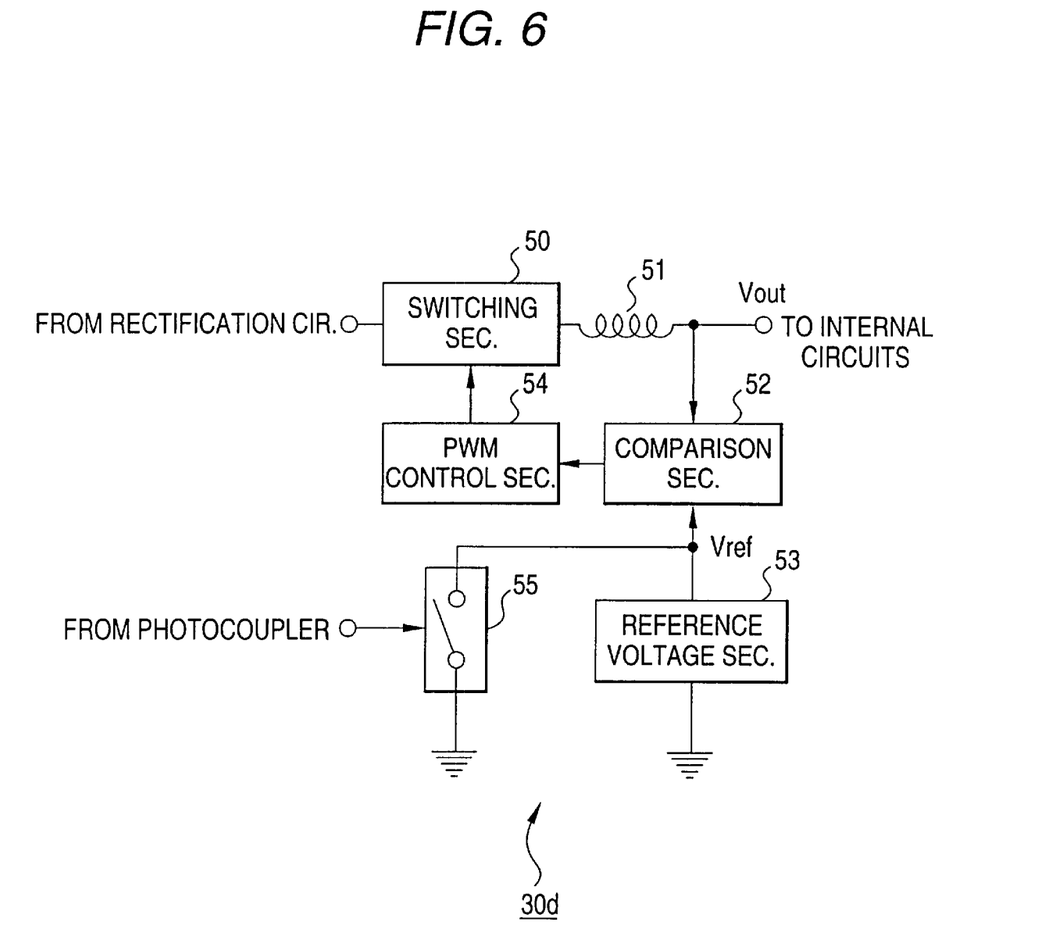
FIG. 6 is a block diagram showing a detailed configuration example of a switching power supply shown in FIG. 5.

As shown in FIG. 6, the switching power supply 30d is composed of a switching section 50, a smoothing coil 51, a comparison section 52, a reference voltage section 53, a PWM control section 54, and a control switch 55.

The switching section 50 lowers a DC voltage of about 100 V that is supplied from a rectification circuit (not shown; circuit for lowering and rectifying a commercial power supply voltage) to a predetermined voltage through switching and outputs it.

The smoothing coil 51 generates a DC voltage by smoothing a rectangular wave that is output from the switching section 50, and outputs it.

The comparison section 52 compares an output voltage Vout of the smoothing coil 51 with a reference voltage Vref that is supplied from the reference voltage section 53, and outputs a comparison result to the PWM control section 54.

The PWM (pulse width modulation) control section 54 controls the switching section 50 in accordance with the comparison result of the comparison section 52.

The control switch 55 is connected to the output terminal of the photocoupler 30c. The control switch 55 is rendered in an on-state (conductive state) when the power supply voltage is not applied to the "V bus +5 V" terminal, and is rendered in an off-state (open state) when "+5 V" is applied to the "V bus +5 V" terminal.

As a result, the reference voltage Vref that is the predetermined voltage is output from the reference voltage section 53 when the power supply voltage is applied to the "V bus +5 V" terminal, and the output level of the reference voltage section 53 becomes the ground level (=0 V) when the power supply voltage is not applied to the "V bus +5 V" terminal.

Next, a detailed configuration example of the USB apparatus 31 shown in FIG. 2 will be described with reference to FIG. 7. The USB apparatus 31 is one having a preheating circuit as in the case of a printer, for example.

Figure 7:
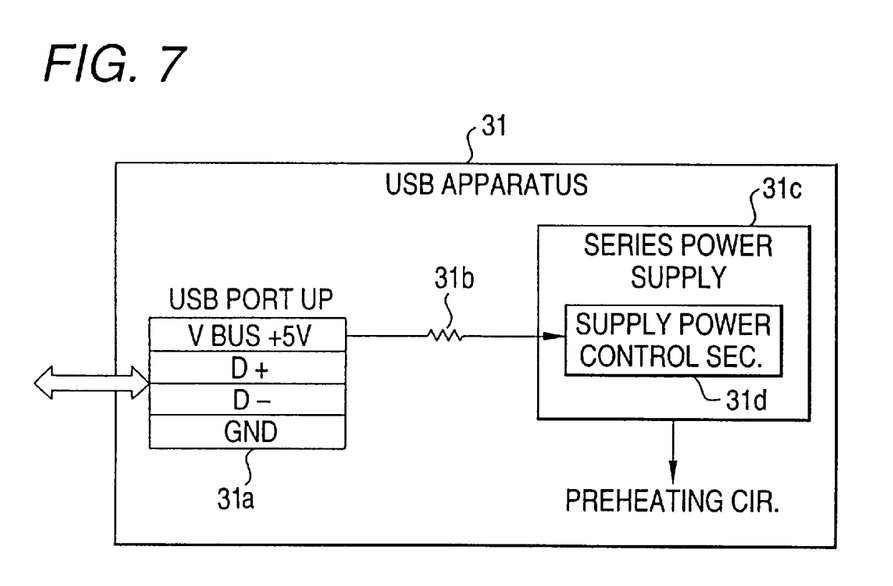
FIG. 7 is a block diagram showing a detailed configuration example of part of a USB apparatus 31 shown in FIG. 2.

As shown in FIG. 7, the USB apparatus 31 is composed of a USB port 31a, a protective resistor 31b, and a series power supply 31c. The series power supply 31c has a supply power control section 31d.

The USB port 31a is composed of a "V bus +5 V" terminal at which a power supply voltage is supplied from the personal computer 10 via the USB hub apparatus 20, "D+" and "D−" terminals for data input/output, and a "GND" terminal that is connected to the chassis.

The protective resistor 31b prevents the supply power control section 31d from being damaged by an excess current flowing through it.

The series power supply 31c is a power supply circuit and supplies DC power to the internal circuits of the USB apparatus 31.

The supply power control section 31d, which is incorporated in the series power supply 31c, controls the power that is supplied from the series power supply 31c to the internal circuits.

Since the series power supply 31c has the same configuration as shown in FIG. 4, it is not described any further.

Next, the operation of the above-configured system according to embodiment will be described.

Now, it is assumed that the power switches of all of the apparatuses are off in the system shown in FIG. 2. If the power switch of the USB hub apparatus 20, for example, is turned on in this state, a voltage is applied to the control section 40 shown in FIG. 4 from the rectification circuit (not shown).

Since the personal computer 10 is not powered in this state, the voltage at the "V bus +5 V" terminal is 0 V. Therefore, the control switch 43 is on and hence the output of the reference voltage section 42 is 0 V.

The comparison section 41 and the control section 40 perform a control so that the output voltage Vout has a value that is the reference voltage Vref multiplied by a predetermined value. Since Vref is 0 V, Vout becomes 0 V.

As a result, the internal circuits of the USB hub apparatus 20 are not supplied with power even though the power switch is turned on.

Since the power supply voltage is not supplied to the "V bus +5 V" terminal of the USB 30a of the USB apparatus 30 either, the output voltage of the photocoupler 30c becomes 0 V.

As a result, the control switch 55 of the switching power supply 30d is on as in the case of the control switch 43 and hence the reference voltage Vref of 0 V is supplied from the reference voltage section 53.

For example, the comparison section 52 controls the PWM control section 54 so that the output voltage Vout of the smoothing coil 51 is kept equal to the reference voltage Vref. Therefore, the output voltage Vout becomes 0 V when the reference voltage Vref is 0 V.

As a result, even if the power switch is turned on, no power is supplied to the internal circuits of the USB apparatus 30.

Further, the series power supply 31c of the USB apparatus 31 performs the same operation as the above-described operation in the USB hub apparatus 20, to establish a state that no power is supplied to the preheating circuit.

Next, if the power switch of the personal computer 10 is turned on in a state that the power switches of all the apparatuses other than the personal computer 10 are on, the voltage at the "V bus +5 V" terminal of the personal computer becomes +5 V.

As a result, the power supply voltage +5 V is also applied to the "V bus +5 V" terminal of the USB hub apparatus 20, whereby the amplification circuit 20b outputs the predetermined voltage.

Receiving the voltage from the amplification circuit 20b, the control switch 43 is turned off, whereupon the reference voltage section 42 outputs the reference voltage Vref that is the predetermined voltage. As a result, the control section 40 outputs the predetermined DC voltage, which is supplied to the internal circuits. The USB hub apparatus 20 is thus rendered operational.

Since the power supply voltage +5 V is applied from the personal computer 10 to the "V bus +5 V" terminal of the USB apparatus 30, the predetermined voltage is output from the photocoupler 30c.

Receiving the output voltage of the photocoupler 30c, the control switch 55 of the switching power supply 30d is turned off, whereupon the reference voltage section 53 outputs the reference voltage Vref that is the predetermined voltage (≠0 V). Since the comparison section 52 controls the PWM control section 54 so that the output voltage Vout is kept equal to the reference voltage Vref, the output voltage Vout becomes the predetermined voltage.

As a result, the predetermined DC voltage is supplied to the internal circuits of the USB apparatus 30.

Further, the power supply voltage +5 V is also supplied from the personal computer 10 to the "V bus +5 V" terminal of the USB apparatus 31 via the USB hub apparatus 20. As a result, the same operation in the USB hub apparatus 20 shown in FIG. 4 is performed, whereby the DC voltage is supplied to the preheating circuit. The USB apparatus 31 is thus rendered operational.

Next, assume that the power switch of the USB hub apparatus 20, for example, has been turned off in the above state (the power switches of all of the apparatuses are on). In this case, the supply of the voltage from the rectification circuit (not shown) to the control section 40 is stopped, and hence the supply of the voltage to the internal circuits is stopped irrespective of the state of the "V bus +5 V" terminal. The voltages of the "V bus +5 V" terminals of the USB apparatuses 31 and 32 become 0 V.

If the power switch of the personal computer 10 is turned off subsequently, the voltages of the "V bus +5 V" terminals of the USB ports of all the apparatuses become 0 V.

Therefore, for example, the control switch 55 of the switching power supply 30d of the USB apparatus 30 is turned on, and hence the reference voltage Vref that is output from the reference voltage section 53 becomes 0 V. As a result, the output voltage Vout also becomes 0 V. That is, a state is established that no power is supplied to the internal circuits of the USB apparatus 30.

Similarly, in the series power supply 31c of the USB apparatus 31, the reference voltage Vref becomes 0 V and hence the output voltage Vout becomes 0 V. As a result, a state is established that no power is supplied to the preheating circuit of the USB apparatus 31.

As described above, according to the embodiment, the supply of power to the internal circuits or the preheating circuit is stopped when one of the power switch of the USB hub apparatus 20 and the USB apparatuses 30–32 is turned on in a state that the power switch of the personal computer 10 is off, whereby useless power consumption can be prevented.

In the above embodiment, the supply of power from the series power supply 20c, the switching power supply 30d, and the series power supply 31c is stopped (i.e., their output voltages are made 0 V) in a state that the power switch of the personal computer 10 is off. Alternatively, for example, the output voltages may be set at a voltage (e.g., 1 V) that is lower than in ordinary operation.

As described above, according to the invention, the supply of a power supply voltage to the internal circuits of a USB apparatus is stopped in a state that the USB apparatus is not supplied with a power supply voltage from the host side. Therefore, useless power consumption can be prevented with a simple circuit configuration.

What is claimed is:

1. A USB apparatus adapted for use with a host computer to transmit and receive information to and from said host computer according to a protocol that complies with a USB standard, comprising:

power supplying means for supplying power to each section of the USB apparatus;

power supply voltage detecting means for detecting presence/absence of a power supply voltage to be supplied from the host computer; and supply power control means for controlling a level of the power supplied by the power supplying means of said USB apparatus in accordance with the detected power supply voltage from the host computer.

2. The USB apparatus according to claim 1, wherein the supply power control means causes the power supplying means to stop supplying power or supply low power if the power supply voltage detecting means has detected that the power supply voltage is not supplied from the host computer, and causes the power supplying means to supply high power if the power supply voltage detecting means has detected that the power supply voltage is supplied from the host computer.

3. A USB hub apparatus adapted to interconnect a host computer to one or more USB apparatuses and allow transmission and reception of information to be performed between the host computer and the USB apparatuses according to a protocol that complies with a USB standard, comprising:

power supplying means for supplying power to each section of the USB hub apparatus;

power supply voltage detecting means for detecting presence/absence of a power supply voltage to be supplied from the host computer; and supply power control means for controlling a level of the power that is supplied by the power supplying means of said USB hub apparatus in accordance with the detected power supply voltage from the host computer.

4. The USB hub apparatus according to claim 3, wherein the supply power control means causes the power supplying means to stop supplying power or supply low power if the power supply voltage detecting means has detected that the power supply voltage is not supplied from the host computer, and causes the power supplying means to supply high power if the power supply voltage detecting means has detected that the power supply voltage is supplied from the host computer.

* * * * *